(No Model.)

E. W. BROADHEAD.
VEHICLE BRAKE.

No. 481,466. Patented Aug. 23, 1892.

WITNESSES:
Chas. Nida
C. Sedgwick

INVENTOR:
E. W. Broadhead
BY
Munn & Co
ATTORNEYS.

UNITED STATES PATENT OFFICE.

ERNEST W. BROADHEAD, OF DOLORES, COLORADO.

VEHICLE-BRAKE.

SPECIFICATION forming part of Letters Patent No. 481,466, dated August 23, 1892.

Application filed March 23, 1892. Serial No. 426,075. (No model.)

*To all whom it may concern:*

Be it known that I, ERNEST W. BROADHEAD, of Dolores, in the county of Montezuma and State of Colorado, have invented a new and useful Improvement in Vehicle-Brakes, of which the following is a full, clear, and exact description.

My invention relates to an improvement in brakes for vehicles, and has for its object to provide a brake of simple, durable, and economic construction capable of being expeditiously and conveniently applied by the occupant of the vehicle, and also to construct the brake in such a manner that the brake-shoes will be normally out of engagement with the wheels, and whereby the brake will be to an extent noiseless and an even tension will be preserved upon all portions of the brake.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
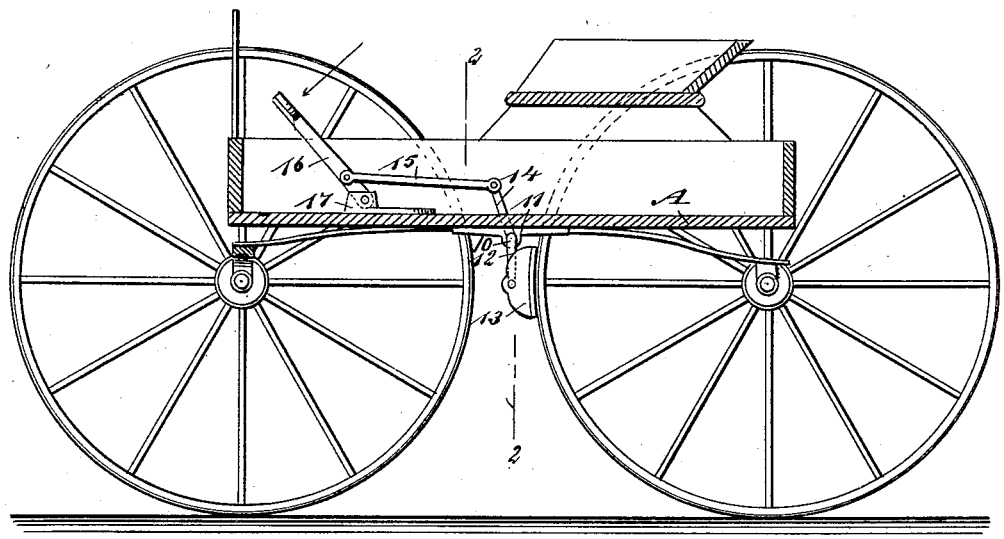
Figure 2:
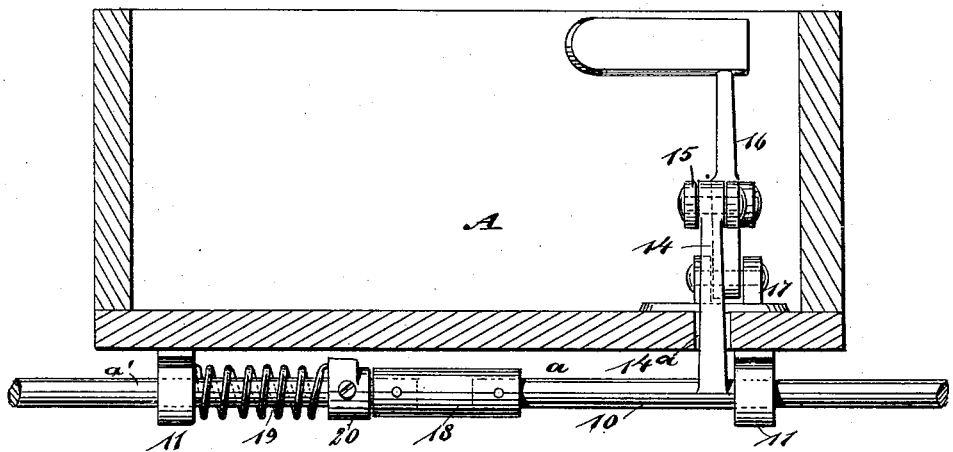

Figure 1 is a vertical longitudinal section through the body of a buggy, illustrating the application of the brake thereto; and Fig 2 is a transverse section on the line 2 2 of Fig. 1.

Transversely beneath the vehicle-body A the brake-shaft 10 is journaled in boxes 11, the latter being attached to the under face of the vehicle-body, one near each side, and the shaft is so located that it extends outward beyond the sides of the vehicle-body between the front and rear wheels. The shaft at its extremity is bent downward to form crank-arms 12, upon which arms the brake-shoes 13 are secured, the latter being of any approved construction and adapted for engagement with the rear wheels.

An arm 14 is attached to the body of the shaft 10, and the said arm extends upward through an opening 14ª in the body of the vehicle and is connected at its upper end by a link 15 with a foot-lever 16, the latter being fulcrumed in a plate 17, secured within the body of the vehicle to the bottom thereof a convenient distance between the center and the dash-board.

The body of the brake or crank shaft is preferably constructed in two sections $a$ and $a'$, as shown in Fig. 2, the sections being united by a coupling 18, and one section of the shaft is encircled by a spring 19, secured at one end in one of the boxes 11 and at the other end in a collar 20, held in engagement with the shaft by means of a set-screw or its equivalent, in order that by the manipulation of the collar more or less tension may be exerted upon the spring.

If in practice it is found desirable, the brake-shaft may be in but one piece; but it is made in sections to secure lightness; and a spring may be coiled around each section of the shaft, although one spring has been found sufficient. I desire it to be further understood that the arm 14, operating the shaft and connected with the foot-lever 16, may be located near one end of the shaft outside of the vehicle-body, if so desired, in which event the foot-lever would also be located outside of the vehicle-body; and in this event, also, collars should be placed upon the shaft in such position as to prevent end movement—as, for instance, outside of the bearings 11; but, preferably the brakes are applied as indicated in the drawings, the foot-lever being located within the vehicle-body.

It will be observed that the device is exceedingly simple and durable, and as the spring 19 is coiled in such a manner as to normally hold the brake-shoes out of engagement with the wheels the brakes must be applied by forcing the foot-lever forward, and the moment the foot-lever is released the shoes by the action of the spring will be removed from engagement with the wheels. The spring also tends to keep an even tension upon all the joints of the brake and renders it comparatively noiseless in operation.

Having thus described my invention, I claim as new and desire to secure by Letters Patent—

1. In a vehicle, the combination of a shaft having crank-arms at its ends carrying brake-shoes and provided with an upwardly-extending arm, a foot-lever, a link connecting the foot-lever with the said upwardly-projecting arm, and a spring surrounding the shaft and having one end secured to the bearing of the shaft and its other end secured to an adjustable collar on the said shaft, substantially as described.

2. In a vehicle-brake, the combination, with a shaft adapted to be journaled beneath a vehicle-body and provided with downwardly-extending crank-arms at its ends having brake-shoes applied thereto, the shaft being constructed in sections and connected by a coupling, and an arm extending upward from the shaft, of a foot-lever, a link connection between the foot-lever and the upwardly-extending arm of the shaft, and a spring encircling the shaft, having one end attached to the shaft-bearing and the other end secured to a collar adjustably fixed upon the shaft, whereby the tension of the spring may be increased or decreased, the said spring being adapted to normally maintain the brake-shoes out of engagement with the wheels, as and for the purpose set forth.

ERNEST W. BROADHEAD.

Witnesses:
WILLIAM M. MAY,
JNO. J. HARRIS.